(12) United States Patent
Rojanskiy et al.

(10) Patent No.: US 7,540,230 B2
(45) Date of Patent: Jun. 2, 2009

(54) THREE-WAY POPPET VALVE FOR WORK EXCHANGER

(75) Inventors: Henrikh Rojanskiy, Akiva (IL); Avraham Ophir, Herzliya (IL)

(73) Assignee: I.D.E. Technologies Ltd., Kadima (IL)

( * ) Notice: Subject to any disclaimer, the term of this patent is extended or adjusted under 35 U.S.C. 154(b) by 504 days.

(21) Appl. No.: 10/559,732

(22) PCT Filed: Jun. 3, 2004

(86) PCT No.: PCT/IL2004/000471

§ 371 (c)(1),
(2), (4) Date: Dec. 7, 2005

(87) PCT Pub. No.: WO2004/111509

PCT Pub. Date: Dec. 23, 2004

(65) Prior Publication Data

US 2006/0151033 A1    Jul. 13, 2006

(51) Int. Cl.
*F15B 13/042*    (2006.01)
*F16K 11/044*    (2006.01)

(52) U.S. Cl. .............. 91/323; 91/465; 137/625.66; 137/625.67

(58) Field of Classification Search .......... 137/625.26, 137/625.27, 625.66, 625.67; 210/321.66, 210/652, 424; 91/465, 323
See application file for complete search history.

(56) References Cited

U.S. PATENT DOCUMENTS 173,653 A * 2/1876 Locke ................ 137/625.67

(Continued)

FOREIGN PATENT DOCUMENTS

DE    35 14859 A1    10/1986

(Continued)

OTHER PUBLICATIONS

U.S. Department of the Interior, "A Flow Work Exchanger for Desalination Processes," Research and Development Progress Report No. 357 (Aug. 1968).

(Continued)

*Primary Examiner*—John Rivell
(74) *Attorney, Agent, or Firm*—The Nath Law Group; Jerald L. Meyer; Sungyeop Chung

(57) ABSTRACT

A three-way two-position poppet valve (10) comprising a housing (12) with a generally cylindrical valve chamber (14), a first (20) and a second (16) port with coaxial 1 valve seats (26, 28) at the ends of the chamber, and a third lateral working port (18). A poppet body (36) is disposed reciprocably in the valve chamber so that in a first position of the poppet body the first valve seat (26) is sealed and the second port communicates with the working port, and in a second position the second valve seat (28) is sealed and the first port communicates with the working port. The valve is characterized in that the housing has two coaxial cylindrical passages (24, 30) adjacent the respective valve seats, while the poppet body has two coaxial cylinder parts (44, 48) slidingly and sealingly fitting the cylindrical passages, so that the poppet body is always supported in at least one of the cylindrical passages and fluid communication between the first and the second port is always prevented.

21 Claims, 5 Drawing Sheets

U.S. PATENT DOCUMENTS

| | | | | |
|---|---|---|---|---|
| 2,484,888 A | * | 10/1949 | Hollerith | 137/625.66 |
| 2,897,836 A | * | 8/1959 | Peters et al. | 137/625.27 |
| 2,973,012 A | * | 2/1961 | Grad | 137/625.25 |
| 3,519,312 A | * | 7/1970 | Cruse | 137/625.67 |
| 3,706,322 A | * | 12/1972 | Carlson | 137/625.66 |
| 4,565,217 A | | 1/1986 | McIntyre | |
| 4,641,686 A | * | 2/1987 | Thompson | 137/625.67 |
| 5,306,428 A | | 4/1994 | Tonner | |
| 5,309,429 A | | 5/1994 | Fukuda | |
| 5,575,150 A | * | 11/1996 | Vieten et al. | 91/465 |
| 5,797,429 A | | 8/1998 | Shumway | |

FOREIGN PATENT DOCUMENTS

| | | |
|---|---|---|
| DE | 195 40 580 A1 | 5/1997 |
| WO | WO 88/06690 | 9/1998 |

OTHER PUBLICATIONS

Gilbert et al., "Development of Flow Work Exchangers for Energy Recovery in Reverse Osmosis Plants," United States Department of the Interior, Office of Saline Water, Research and Development Progress Report No. 680 (Apr. 1971).

* cited by examiner

THREE-WAY POPPET VALVE FOR WORK EXCHANGER

FIELD OF THE INVENTION

This invention relates to three-way poppet valves, more particularly to valves specially designed for use in work exchanger systems.

BACKGROUND OF THE INVENTION

A work exchanger is a device that obtains energy from one stream of fluid and transfers that energy to another stream. It can be also described as a pump driven by fluid flow, most often of opposed piston/diaphragm type. Work exchangers are vital for energy recovery in reverse osmosis processes such as desalination, since by itself the RO separation is power-consuming process which becomes economically feasible if only a substantial part of the energy resident in the reject or/and permeate streams is returned back into the process.

A work exchanger system typically comprises two (or more) pressure cylinder vessels with a brine port at one end, a feed water port at the other end, and a plunger freely sliding between the ports. A system of valves connects and disconnects these ports to high-pressure brine line coming from RO modules, brine discharge line, low-pressure feed water line, and high-pressure feed water line going to the RO modules. Each pressure cylinder performs a two-stroke cycle whereby the energy of the high-pressure brine is transferred to the stream of feed water. The resulting low-pressure brine is discharged.

At the first stroke, the brine port is connected to the brine discharge line while the feed water port is connected to the low-pressure feed water line. The vessel is filled with low-pressure feed water which displaces the plunger towards the brine port and brine is discharged through the non-pressurized discharge line.

At the second stroke, the brine port is connected to the high-pressure brine line, while the feed port is connected to the high-pressure feed water line. The vessel is filled with high-pressure brine which displaces the plunger back towards the feed port so as to squeeze feed water into the high-pressure feed water line.

The operation of the work exchanger requires special timing, reliable synchronization and sealing of the valves in order to perform efficiently the above two-stroke cycle.

A report on experimental work "A Flow Work Exchanger for Desalination Processes", Kansas state Univ., Manhattan, August 1968, discloses usage of pilot-operated Hunt double plunger hydraulic valve with a work exchanger. This valve has a housing with two parallel cylinder bores and four lateral ports opening into the bores. Two rigidly connected parallel plungers are movable in the bores, providing communication between the ports through specially formed channels and cavities in plunger bodies. The plungers are always in hydrostatic balance.

U.S. Pat. No. 5,306,428 to Tonner discloses a rotary valve used to direct brine to/from different work exchanger ports. The feed water stream is regulated by two check valves at each feed water port. The rotary valve of Tonner is not hydraulically balanced, which causes excessive wear on the sealing surfaces due to side loads exerted on the central rotating assembly. There are also internal and external leakage problems between the high pressure inlet and outlet ports and the low pressure drain ports. This, in turn, reduces the efficiency of the Tonner valve and imposes size limits on any such device that can be manufactured in practice.

U.S. Pat. No. 5,797,429 to Shumway suggests the usage of a five-way or four-way linear spool valve in a work exchanger system. The Shumway valve comprises two pistons connected by a rod (spool) located inside a cylinder. The cylinder has five ports: a high pressure brine inlet, a first work exchanger vessel port, a second work exchanger vessel port, and two low-pressure brine discharge outlets which may be connected. By moving the spool back and forth within the cylinder, the work exchanger ports are alternately opened and closed, and this directs flow in the proper sequence to the proper port. The feed water stream in the Shumway work-exchanger system is regulated by two check valves at the feed water port of each exchanger vessel.

The linear spool valve of Shumway is hydraulically balanced axially. As a result, the force required to move the linear spool is only that force needed to overcome the friction of the sealing surfaces associated with the pistons, which permits the driving device of the valve to be of low power. However, the Shumway valve has also leakage problems. The attempts to reduce leakage by tighter fitting of the pistons to the cylinder lead to excessive wear which seems to be an inherent problem in every spool valve device because the sealing in spool valves is not provided by positive displacement. This problem is even more aggravated in work exchangers of large capacity and power that are employed in modern desalination plants using RO technology.

Poppet valves have relatively simple design and provide very reliable sealing achieved by positive displacement. A typical three-way poppet valve comprises a valve chamber with a central port and two coaxial valve seats leading to two end ports, and a poppet body disposed in the valve chamber. The poppet body is adapted for reciprocation between two positions so that in a first position it seals the first valve seat and fluid communication is provided between one end port and the central port, and in a second position the poppet body seals the second valve seat and fluid communication is provided between the other end port and the central port. However, during the travel between the valve seats, the poppet body allows fluid communication between all three ports. The poppet valve also shuts-off and opens abruptly which may cause water hammer, and is not hydraulically balanced.

SUMMARY OF THE INVENTION

According to the present invention, there is provided a three-way two-position poppet valve comprising a housing with a first port, a second port, a third working port and a generally cylindrical valve chamber with an axis. The valve chamber is defined between a first coaxial annular valve seat associated with the first port, and a second coaxial annular valve seat associated with the second port. The working port is connected laterally to the valve chamber. The poppet valve further comprises a poppet body disposed in the valve chamber and adapted for reciprocation between two positions so that in a first position the poppet body seals the first valve seat and fluid communication is provided between the second port and the working port, and in a second position the poppet body seals the second valve seat and fluid communication is provided between the first port and the working port.

The valve is characterized in that the housing has a first coaxial cylindrical passage adjacent the first valve seat and a second coaxial cylindrical passage adjacent the second valve seat, while the poppet body has a first coaxial cylinder part slidingly and sealingly fitting the first passage, and a second coaxial cylinder part slidingly and sealingly fitting the second passage, so that the poppet body is always supported in at least one of the cylindrical passages and fluid communication between the first and the second ports is always prevented. The cylindrical passages and the cylinder parts of the poppet body preferably have the same diameter D.

In one embodiment of the three-way valve, the first valve seat is at a distal end of the first cylindrical passage, adjacent the first port, and a distal end of the first cylinder part of the poppet is equipped with a first sealing rim matching the first valve seat. Preferably, the first cylindrical passage has a proximal part flaring towards the poppet body so that the first cylinder part of the poppet body would smoothly change the flow through the first port and the pressure in the valve chamber when entering or exiting the first cylinder passage.

The second valve seat is at a proximal end of the second cylindrical passage, adjacent the valve chamber, and a proximal end of the second cylinder part of the poppet is equipped with a second sealing rim matching the second valve seat. Preferably, said poppet body further comprises a profiled part adjacent to the distal end of the second cylinder part, so that the profiled part would smoothly change the flow through the second port and the pressure in the valve chamber when entering or exiting the second cylinder passage.

The profiled part has a shape adapted to change flow section area of the second valve seat as a predetermined function of time for a given velocity of the poppet body axial movement. Preferably, the profiled part comprises a shallow straight cylinder step adjacent to the distal end of the second cylinder part, the cylinder step having radial depth and axial length such that, after the second cylinder part leaves the second cylinder passage, pressures in the second port and in the working port are equalized in a predetermined finite time for a given velocity of the poppet body axial movement.

In another embodiment of the three-way poppet valve, the second port is disposed laterally to the axis and the housing further comprises an auxiliary coaxial cylinder chamber of diameter D communicating at a proximal end thereof with the second port and the second cylindrical passage, and closed at a distal end thereof by a lid. An auxiliary piston is mounted for sliding in the auxiliary chamber and is firmly connected to the poppet body by an axial rod. The auxiliary piston, the axial rod and the poppet body form a poppet assembly which is axially balanced with respect to flow pressure in the second port.

The auxiliary piston sealingly fits the auxiliary cylinder chamber, thereby defining a sealed volume between the lid and the auxiliary piston. Preferably, the sealed volume is provided with fluid communication to the first port, so that pressures acting on the poppet assembly from the sealed volume and from the first port are equalized. The fluid communication may be provided by an external pipe connecting the sealed volume to the first port or by a channel made in the rod.

According to another aspect of the present invention, there is provided a work exchanger module adapted to utilize the energy of high-pressure working fluid for pumping feed fluid, comprising an exchanger cylinder with a first working fluid end and a second feed fluid end, and a piston freely sliding therebetween. A first three-way poppet valve as above is connected by its working port to the first end of the exchanger cylinder, by its second port to a source of high-pressure working fluid and by its firs port to a non-pressurized discharge outlet. A second three-way poppet valve is connected by its working port to the second end, by its first port to a source of low-pressure feed fluid and by its second port to a high-pressure feed fluid consumer.

According to yet another aspect of the present invention, the two poppet valves of the above work exchanger module are equipped with a first and a second hydraulic cylinder, each having a "push" and a "pull" port, such that connecting the "push" port to a pressure source would drive the associated poppet valve to the first position thereof and vice-versa, wherein the "push" port of the first hydraulic cylinder is connected directly to the "pull" port of the second hydraulic cylinder. Thereby, the reciprocating motions of the two poppet valves are fully synchronized.

Preferably, for such synchronized motion, the flaring part of the first cylindrical passage in the first three-way poppet valve is axially longer than the corresponding flaring part in the second three-way poppet valve, so that when the two poppet bodies move towards opening the first port in both three-way valves, the first port in the first valve is connected to the exchanger cylinder before the first port of the second valve.

The poppet valve of the present invention provides combined advantages of poppet and spool valves: reliable sealing of the ports, avoiding mixing of flows and leakages, controlled shut-off and opening of the flow passages and preventing water-hammer, axially balanced poppet assembly allowing low-power drives, reduced use of expensive materials, robust construction and low production costs.

The three-way poppet valve of the present invention is advantageously used in energy recovery plants of RO installations of large capacity. It allows constructing of large work exchanger units where a number of exchanger cylinders are connected in parallel to one poppet valve. Opposite-phase operation of two work exchangers, which is necessary in such energy recovery plant, can be effectively synchronized by designing the profile of the poppets such that while one valve opens its high-pressure brine port and the other valve closes its high-pressure brine port, the total sectional area of the high-pressure brine flow remains constant.

The three-way poppet valve of the present invention, with the hydraulic drive, can be advantageously used also at the feed water end of the work exchangers, instead of two check valves. Thus, with no springs or other elastic elements used in valve motion, arbitrary closing/opening or "hesitation" of the valves is avoided, as well as noise and "water hammer".

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
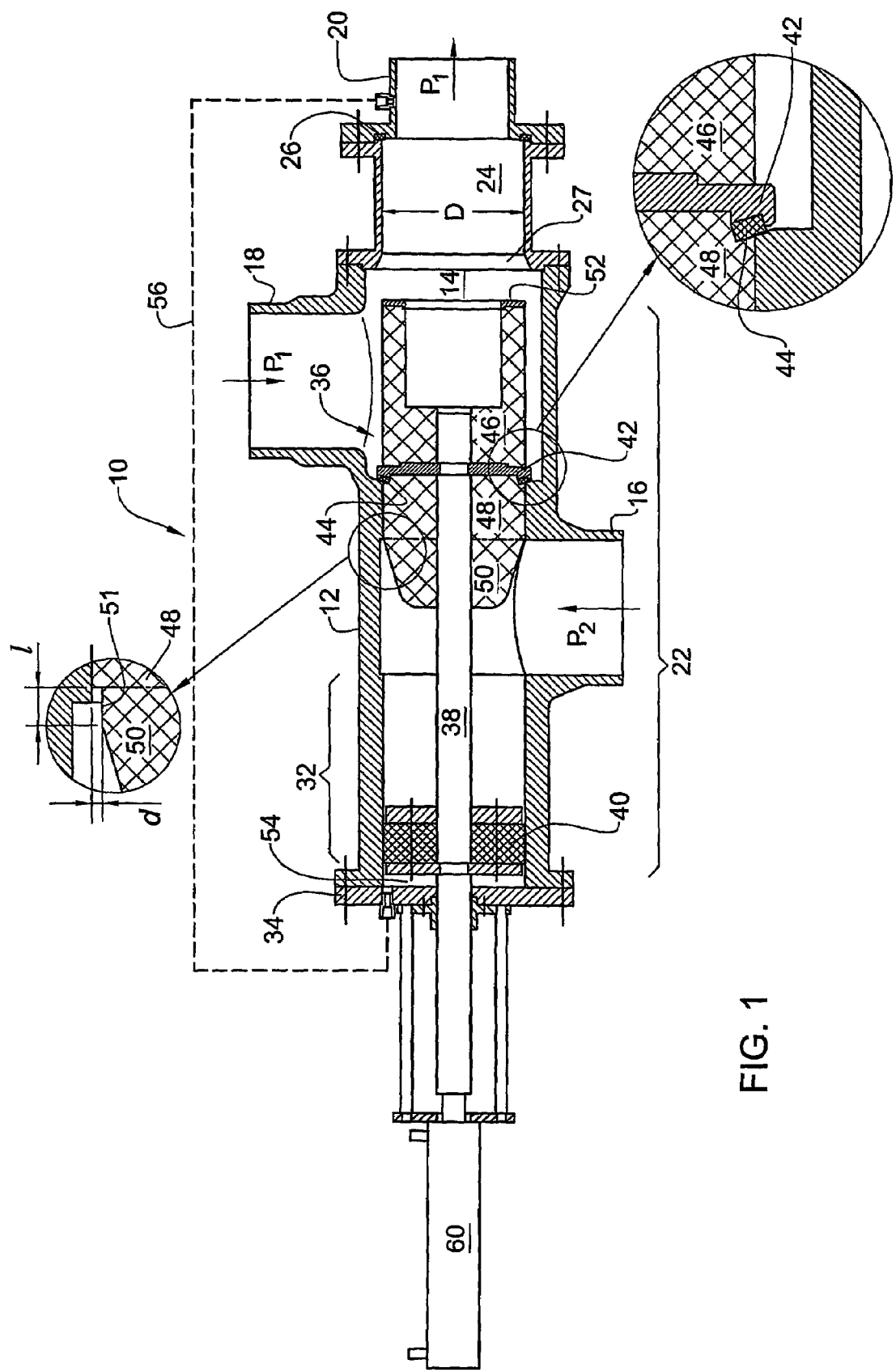
FIG. 1 is a schematic cross-sectional elevation of a three-way balanced poppet valve of the present invention, in a first extreme position of the poppet.
Figure 2:
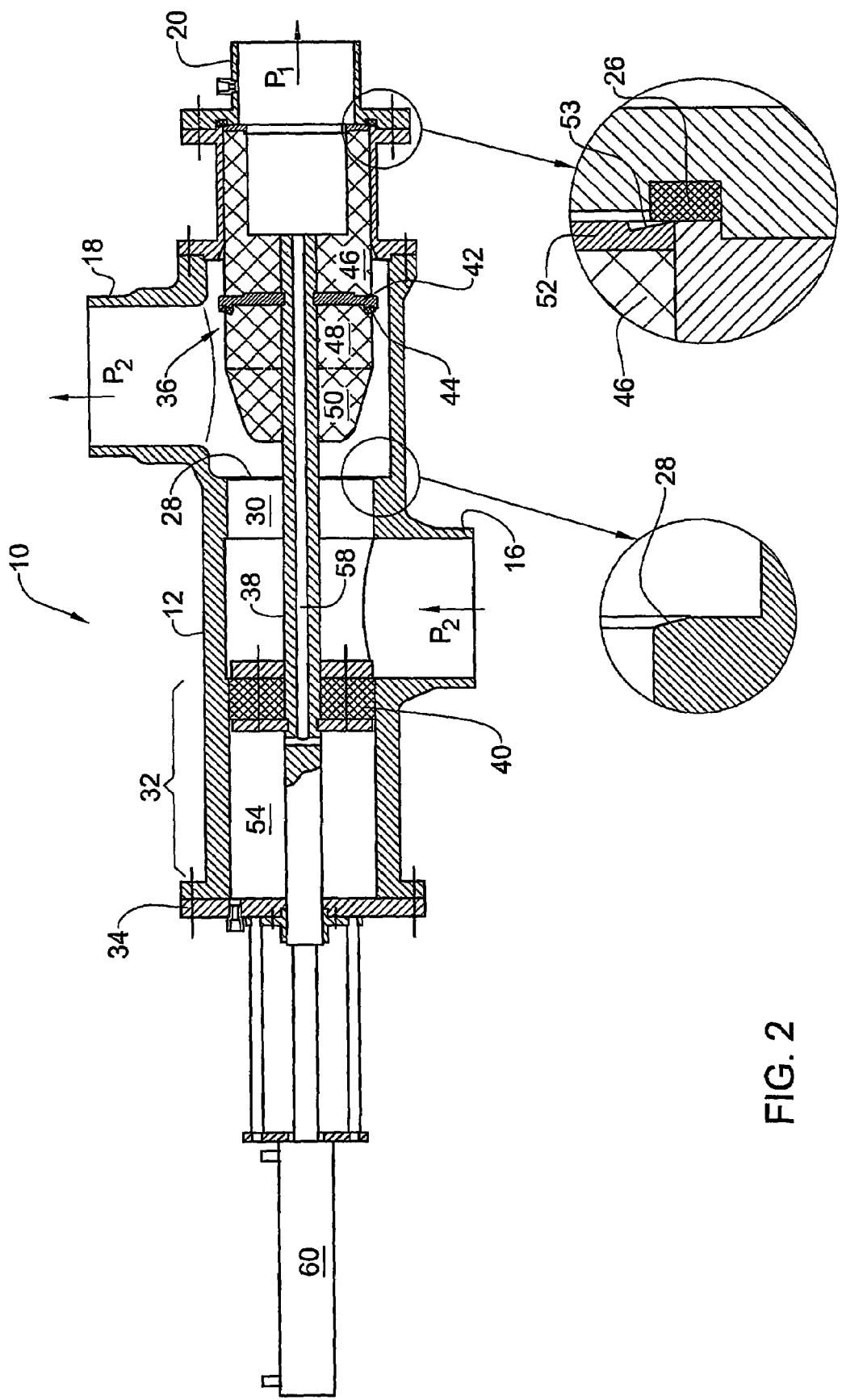
FIG. 2 is a schematic cross-sectional elevation of the three-way balanced poppet valve of FIG. 1 in a second extreme position of the poppet.

With reference to FIGS. 1 and 2, there is shown a three-way, two-position poppet valve 10 comprising a housing 12 with a generally cylindrical valve chamber 14, a first (outlet) port 20, a second (inlet) port 16, a third (working) port 18, and a poppet assembly 22. The valve chamber 14 has a coaxial cylinder passage 24 of diameter D towards the inlet port 16. The cylindrical passage 24 comprises a first valve seat 26 of diameter D disposed at the distal end thereof, in communication with the axial outlet port 20, and a flaring annular part 27 at the proximal end. A second annular valve seat 28 is at the opposite side of the valve chamber 14, communicating with the inlet port 16. The working port 18, which is disposed laterally between the valve seats 26 and 28, is directly communicating with the valve chamber 14. A coaxial cylinder passage 30 of diameter D is provided between the valve seat 28 and the inlet port 16. The housing 12 further has an auxiliary coaxial cylinder chamber 32 of diameter D adjacent to and communicating with the inlet port 16, the auxiliary chamber being closed by a lid 34. It should be noted that the first port 20 and the second port 16 are named here "outlet" and "inlet" just for convenience while either of them can be inlet or outlet.

The poppet assembly 22 comprises a poppet body 36 with an axial stem 38 and an auxiliary piston 40. The poppet body 36 comprises a metal dish 42 fixed to the stem 38 and having a sealing rim with an annular seal 44, a first cylinder body 46 with a metal sealing ring 52, and a second cylinder body 48 with a profiled, generally tapering, extremity 50. Both the flaring part 27 and the extremity 50 profile are designed for obtaining smooth flow at opening and closing the first and the second port, respectively. Their particular form depends on the application of the valve as will be explained below. The cylinder bodies 46 and 48 fit slidingly and sealingly into the cylindrical passages 24 and 30, respectively. The auxiliary piston 40 fits sealingly into the auxiliary chamber 32, thereby defining a balancing pressure chamber 54 between the piston 40 and the lid 34. The pressure chamber 54 is in fluid communication with the outlet port 20 via a pipe 56 (shown in FIG. 1) or, alternatively, via a channel 58 obtained through the stem 38 (shown in FIG. 2). The axial stem 38 extends, with a sealing sliding fit, through an opening in the lid 34 and is connected to an external hydraulic cylinder 60.

In operation, the hydraulic cylinder 60 reciprocates the poppet assembly 22 between two extreme positions: in a first position (shown in FIG. 2), the first valve seat 26 is sealed by the sealing ring 52 and fluid communication is provided between the second (inlet) port 16 and the working port 18 under pressure $P_2$; and in a second position (shown in FIG. 1), the second valve seat 28 is sealed by the sealing rim 44 and fluid communication is provided between the working port 18 and the first (outlet) port 20 under pressure $P_1$.

During the reciprocating motion, the poppet assembly 22 is supported by the cylinder bodies 46 and 48 sliding in the cylinder passages 24 and 30. The axial lengths of the cylinder bodies and the cylinder passages are selected so that cylinder passages 24 and 30 are never opened simultaneously and thus flows via the first port 20 and the second port 16 are not mixed. These axial lengths may be further varied if necessary for adjusting the valve operation cycle (timing) to the working cycle of a machine where the valve is used.

The profiled extremity 50 of the poppet body has a shape adapted to change flow section area of the second valve seat 28 as a predetermined function of time for a given velocity of the poppet body axial movement. For example, if two valves 10 are used with two work exchange cylinders operating in opposite phase (see FIG. 4, valves 80 and 80'), the extremities of their respective poppet bodies may be shaped so that when one valve opens its second port and the other valve closes its second port, the total sectional area of the flow through these second ports remains constant.

The profile of the extremity 50 has a shallow straight cylinder step 51 adjacent to the second cylinder body 48, with depth d and axial length l. These dimensions are selected such that, when the second cylinder body 48 leaves the second cylinder passage 30 opening it, pressures in the second port 16 and in the working port 18 are equalized to $P_2$ in a predetermined finite time for a given velocity of the poppet body axial movement. This timing is necessary in order to avoid occurring of "water hammer". It will be appreciated that particular dimensions of the step 51 depend also on the pressure differential between ports 16 and 18 before opening of the valve seat 28, on the volume of a fluid container filled through the working port 18, and on the elastic properties of this container, the associated piping, and of the fluid. For example (see FIG. 3), a work exchanger vessel 72 of volume V connected to a poppet valve 80 may operate under high pressure $P_2$=70-80 ata and expand its volume by $\Delta V$ when exposed to such pressure. The vessel 72, the water therein, and the connecting piping thereabout constitute an elastic oscillating system characterized by basic natural frequency f or period T. Thus, it is desirable to feed the volume of water $\Delta V$ into the vessel, under the pressure $P_2$, after the valve seat 28 is opened, for a time equal or longer than half the period T. This time can be attained by selecting the depth d and the axial length l of the step 51.

With reference to FIG. 2, in the first extreme position of the poppet, axial forces applied to the poppet assembly 22 from the pressure $P_2$ within the assembly are mutually balanced, since the chamber 32 and the passage 24 have the same diameter D. These forces are balanced during the whole travel of the poppet assembly towards the second extreme position and in the second position (FIG. 1).

The axial pressures acting from the balancing pressure chamber 54 onto the piston 40 and from the outlet port 20 onto the cylinder body 46 are both equal to $P_1$ due to the fluid communication 56 (or 58) that transmits the pressure of the outlet port 20 to the chamber 54. However in the first position (FIG. 2), the area of the poppet body exposed to the axial pressure $P_1$ in the valve seat 26 is slightly less than $\pi D^2/4$ because the annular seal contact surface has finite width extending inside of the diameter D. (This width can be minimized by the channel 53 in the sealing ring 52). Conversely, in the second position (FIG. 1), the area of the poppet body exposed to pressure $P_1$ in the valve seat 28 is slightly more than $\pi D^2/4$ because the annular contact surface of the seal 44 has finite width extending outside of the diameter D. Between the extreme positions, the area of the poppet body exposed to the axial pressure $P_1$ from the outlet port 20 is equal to $\pi D^2/4$. The area of the piston 40 exposed to pressure $P_1$ is also less than $\pi D^2/4$ by the area of the rod 38 cross-section.

The above balancing scheme is especially advantageous for use with the pressure in the second port much higher than the pressure in the first port ($P_2>>P_1$) since all unbalance due to differences of areas is associated with the lower pressure. Thus, the construction of the three-way poppet valve of the present invention allows the poppet assembly to be reciprocated without overcoming pressure differentials of the inlet and outlet flows, while the constant diameter D facilitates working and finishing of the bores 24, 30 and 32 in the housing 12.

Figure 3:
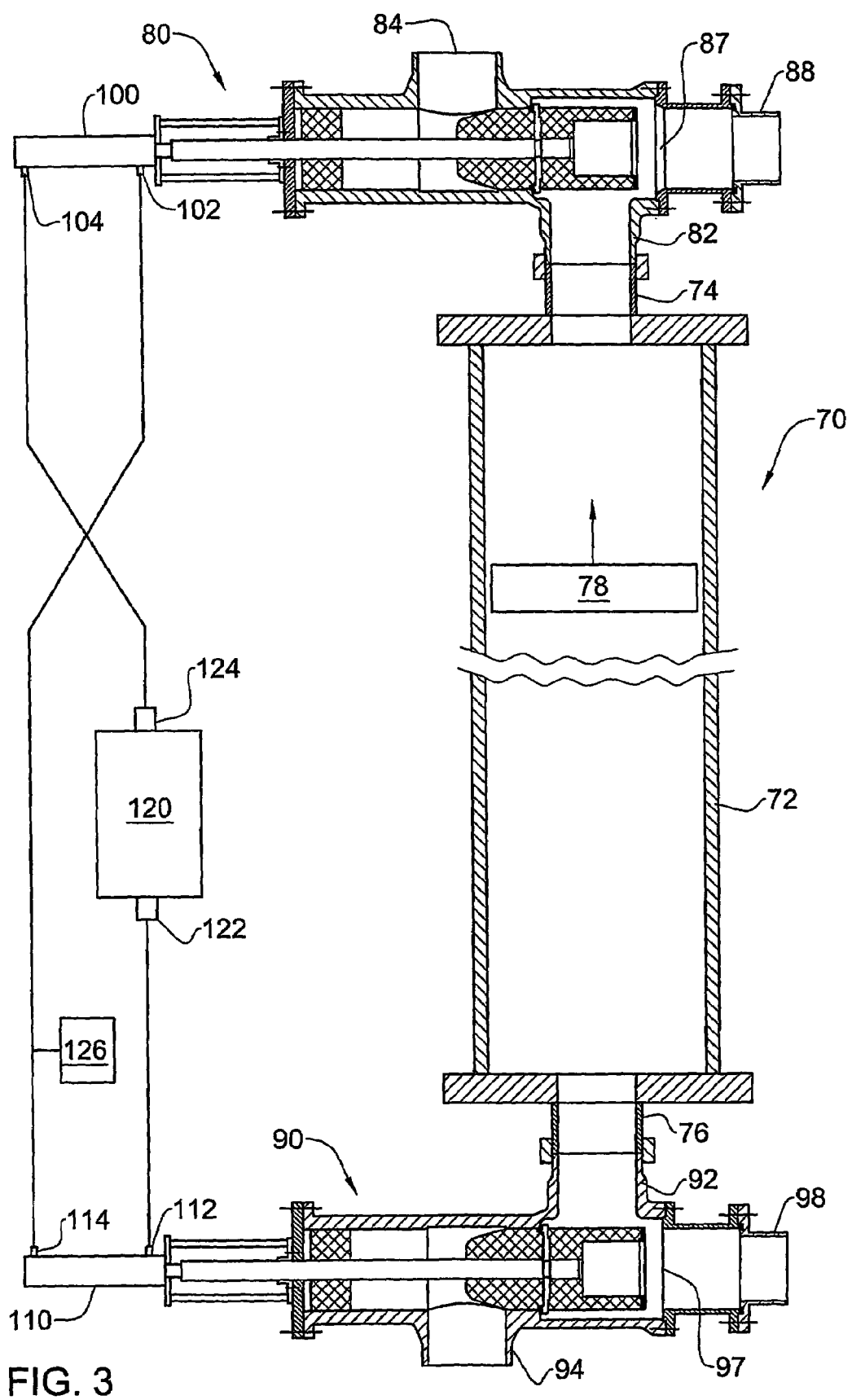
FIG. 3 is a schematic cross-sectional elevation of a work-exchanger module equipped with two three-way poppet valves of the present invention.
Figure 4:
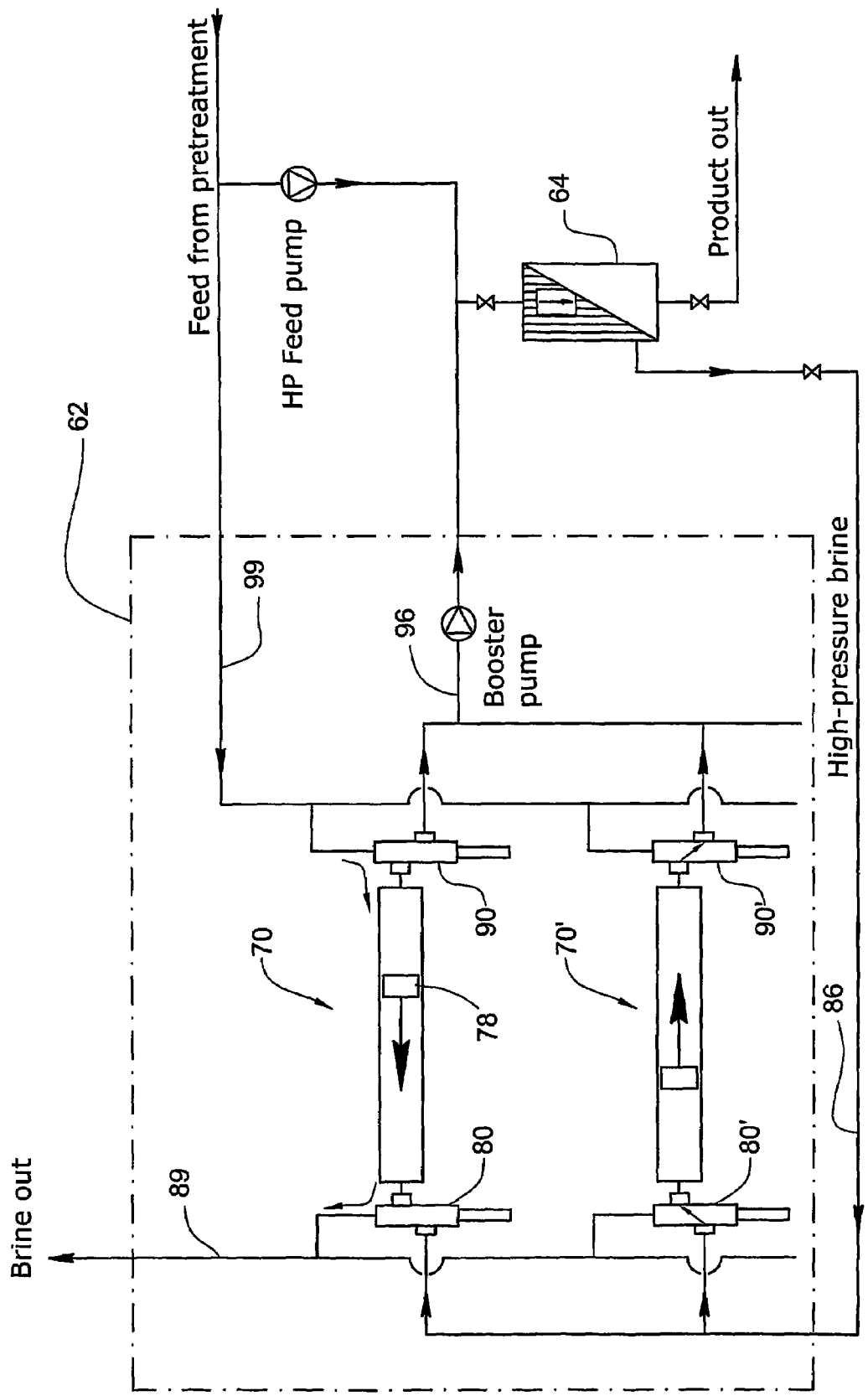
FIG. 4 is a scheme of a RO desalination plant with energy recovery plant comprising the work exchanger of FIG. 3.

With reference to FIGS. 3 and 4, there are shown two identical work exchanger modules 70 and 70' used in a power recovery system 62 connected to a reverse osmosis desalination plant 64 (RO plant). The power recovery system 62 utilizes the energy of high-pressure brine for pumping feed water to the RO plant.

The module 70 comprises an exchanger cylinder 72 with a brine port 74 at one end, a feed water port 76 at the second end, and a plunger 78 freely sliding between the ports. The module 70 is equipped with two three-way poppet valves, as described in relation to FIGS. 1 and 2. The first three-way poppet valve 80 is connected by its working port 82 to the brine port 74, by its second (inlet) port 84 to a high-pressure brine line 86 of the RO plant, and by its first (outlet) port 88 to a non-pressurized brine discharge line 89. The second three-way poppet valve 90 is connected by its working port 92 to the feed water port 76, by its second (outlet) port 94 to a high-pressure feed line 96 of the RO plant, and by its first (inlet) port 98 to a low-pressure feed line 99. In the position of the poppet valves 80 and 90 shown in FIG. 3, the work exchanger module 70 receives low-pressure feed water and discharges brine. The work exchanger module 70' has its valves 80' and 90' in reverse position where high-pressure brine is fed into the cylinder and pumps high-pressure feed water into the RO plant.

With reference only to FIG. 3, the first poppet valve 80 has a hydraulic cylinder 100 with ports "pull" 102 and "push" 104, the second poppet valve 90 has a hydraulic cylinder 110 with ports "pull" 112 and "push" 114, and the hydraulic cylinders are powered by a hydraulic station 120 with inlet port 122 and outlet port 124. The "pull" port 102 of the cylinder 100 is connected directly to the "push" port 114 of the other hydraulic cylinder 110, while the "push" port 104 of the cylinder 100 is connected to the hydraulic station outlet 124 and the "pull" port of the cylinder 110 is connected to the hydraulic station inlet 122. The line 102-114, which is not connected to the hydraulic station, has means for compensation of leakage 126.

It would be appreciated that in this way the reciprocation of the two poppet valves is synchronized: When high pressure is fed to the hydraulic station outlet 122, the piston of the cylinder 110 and the poppet valve 90 are pulled to the position of FIG. 3 while simultaneously the cylinder 100 and the poppet valve 80 are pulled to the same position due to the connection 114-102. The reverse motion is also synchronized. This method of synchronization is suitable for use with sensors (not shown) for measuring position and speed of the plunger 78.

The first three-way poppet valve 80 may have a flaring annular part 87 of the cylindrical passage 24 which is axially longer than the corresponding flaring part 97 in the second poppet valve 90, so that during synchronized motion of the two poppet bodies towards opening the first ports 88, 98 in both three-way valves, the first port 88 in the first valve 80 is connected to the exchanger cylinder 72 before the first port 98 of the second valve 90. This is done in order to relief the high pressure in the exchanger cylinder 72 from the previous (second) stroke into the brine discharge line 89 (see also FIG. 4) and not into the low-pressure feed line 99.

Figure 5A:
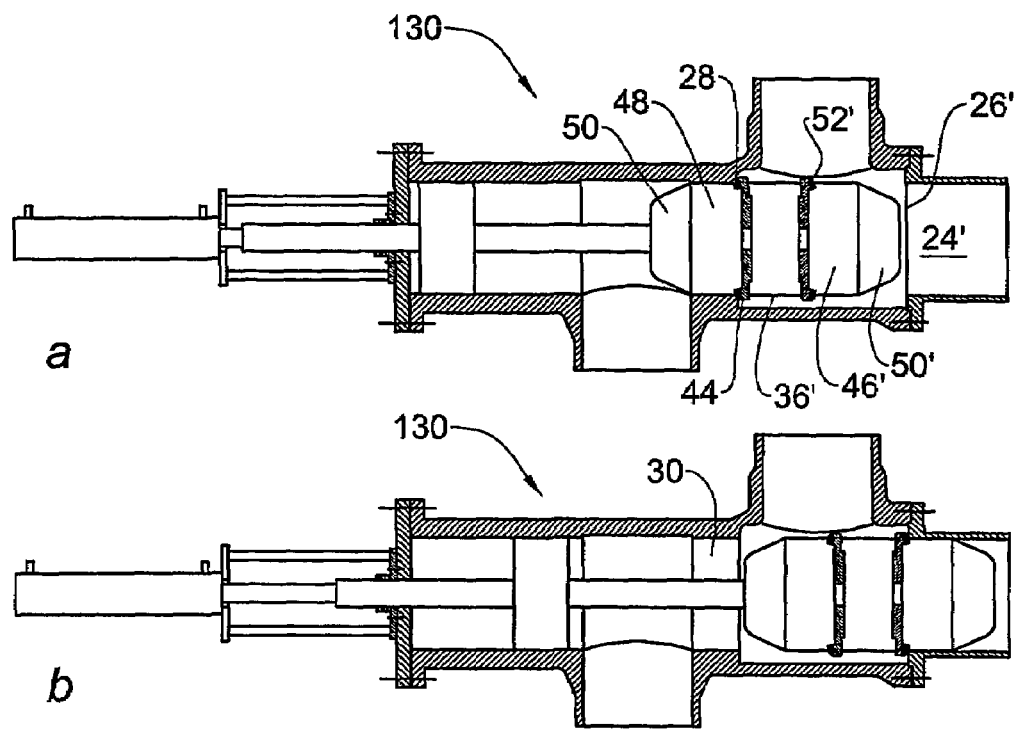
FIGS. 5A and 5B show alternative embodiments of the three-way poppet valve of the present invention.
Figure 5B:
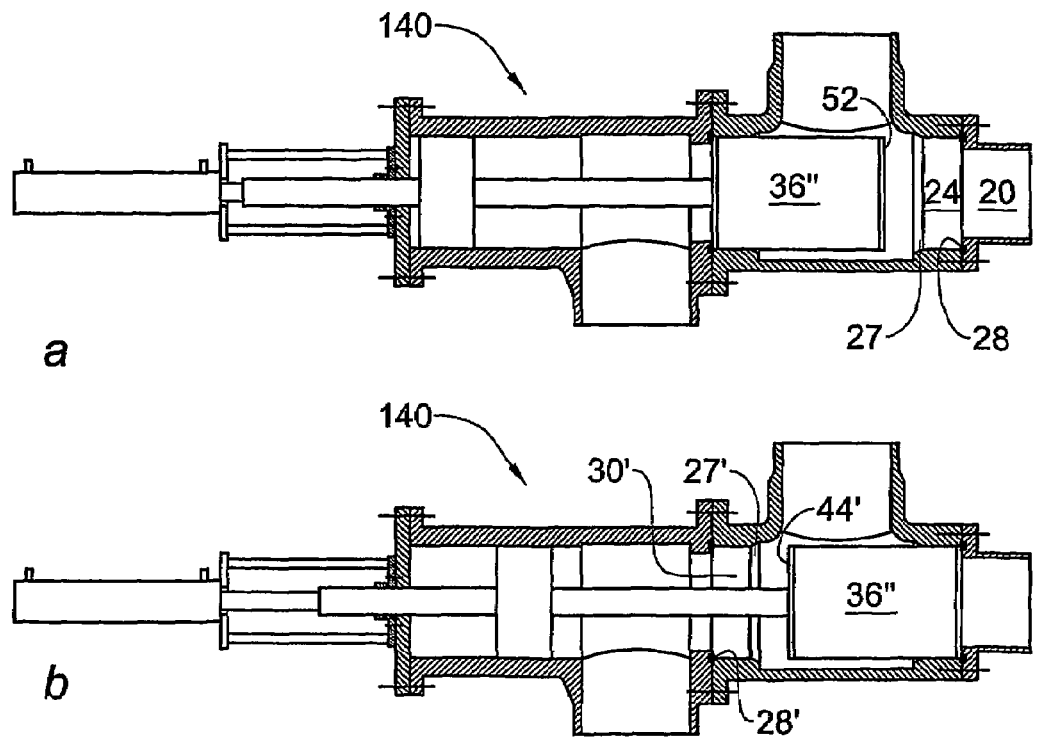

Although a description of specific embodiments has been presented, it is contemplated that various changes could be made without deviating from the scope of the present invention. For example, the poppet valve of FIG. 1 could be modified as shown in FIGS. 5A and 5B. In FIG. 5A, a three-way poppet valve 130 has a cylinder passage 24' at the axial outlet 20 designed symmetrically to the cylinder passage 30, with a valve seat 26' similar to the valve seat 28 (see FIG. 1). The poppet body 36' in this case has symmetrical form with a cylindrical body 46' complemented by a profiled extremity 50', and a sealing rim 52' similar to the rim 44. Alternatively, as shown in FIG. 5B, a three-way poppet valve 140 may have a cylinder passage 30' designed symmetrically to the cylinder passage 24, with valve seat 28' at the distal end of the passage 30', and a flaring annular part 27' at the proximal end. The poppet body 36" in this case is a symmetrical cylinder without profiled extremities. The second sealing rim 44' is similar to the sealing rim 52. These valve variations, however, can not be balanced completely with respect to either pressure $P_2$ or $P_1$.

The invention claimed is:

1. A three-way two-position poppet valve comprising a housing with a first port, a second port, a third working port and a generally cylindrical valve chamber with an axis, said valve chamber being defined between a first coaxial annular valve seat associated with said first port, and a second coaxial annular valve seat associated with said second port, said working port being connected laterally to said valve chamber, said poppet valve further comprising a poppet body disposed in said valve chamber and adapted for reciprocation between two positions so that in a first position the poppet body seals said first valve seat and fluid communication is provided between said second port and said working port, and in a second position the poppet body seals said second valve seat and fluid communication is provided between said first port and said working port;

wherein said housing has a first coaxial cylindrical passage adjacent said first valve seat and a second coaxial cylindrical passage adjacent said second valve seat, said poppet body has a first coaxial cylinder part slidingly and sealingly fitting said first passage, and a second coaxial cylinder part slidingly and sealingly fitting said second passage, so that said poppet body is always supported in at least one of the cylindrical passages and fluid communication between said first and said second ports is always prevented.

2. The three-way poppet valve of claim 1, wherein the two coaxial cylindrical passages and the two coaxial cylinder parts of the poppet body have the same diameter D.

3. The three-way poppet valve of claim 2, wherein said second valve seat is at a proximal end of said second cylindrical passage, adjacent said valve chamber, and a proximal end of said second cylinder part of the poppet is equipped with a second sealing rim matching said second valve seat.

4. The three-way poppet valve of claim 3, wherein said poppet body further comprises a profiled part adjacent to the distal end of said second cylinder part, so that said profiled part would smoothly change the flow through the second port and the pressure in the valve chamber when entering or exiting said second cylinder passage.

5. The three-way poppet valve of claim 4, wherein said profiled part comprises a shallow straight cylinder step adjacent to the distal end of said second cylinder part, said cylinder step having radial depth and axial length such that, after said second cylinder part leaves said second cylinder passage, pressures in said second port and in said working port are equalized in a predetermined finite time for a given velocity of the poppet body axial movement.

6. The three-way poppet valve of claim 4, wherein said profiled part has a shape adapted to change flow section area of the second valve seat as a predetermined function of time for a given velocity of the poppet body axial movement.

7. The three-way poppet valve of claim 3, wherein said first valve seat is at a distal end of said first cylindrical passage, adjacent said first port, and a distal end of said first cylinder part of the poppet is equipped with a first sealing rim matching said first valve seat.

8. The three-way poppet valve of claim 7, wherein said first cylindrical passage has a proximal part flaring towards said poppet body so that said first cylinder part of the poppet body would smoothly change the flow through the first port and the pressure in the valve chamber when entering or exiting said first cylinder passage.

9. The three-way poppet valve of claim 8, wherein said second port is disposed laterally to said axis and said housing further comprises an auxiliary coaxial cylinder chamber of diameter D communicating at a proximal end thereof with said second port and said second cylindrical passage, and closed at a distal end thereof by a lid, an auxiliary piston being mounted for sliding in said auxiliary chamber and being firmly connected to said poppet body by an axial rod, so that the auxiliary piston, the axial rod and the poppet body form a poppet assembly which is axially balanced with respect to flow pressure in the second port.

10. The three-way poppet valve of claim 9, wherein said auxiliary piston sealingly fits said auxiliary cylinder chamber, thereby defining a sealed volume between said lid and said auxiliary piston, said sealed volume being provided with fluid communication to said first port, so that pressures acting on the poppet assembly from said sealed volume and from said first port are equalized.

11. The three-way poppet valve of claim 10, wherein said axial rod extends, with a sealing sliding fit, through an opening in said lid and is connectable to an external drive means for moving the poppet assembly between the two positions thereof.

12. The three-way poppet valve of claim 11, wherein said drive means is a hydraulic cylinder connected to said rod.

13. The three-way poppet valve of claim 10, wherein said fluid communication is provided by an external pipe connecting said sealed volume to said first port.

14. The three-way poppet valve of claim 10, wherein said fluid communication is provided by a channel obtained through said axial rod.

15. A work exchanger module adapted to utilize the energy of high-pressure working fluid for pumping feed fluid to a feed fluid consumer, comprising an exchanger cylinder with a first working fluid end and a second feed fluid end, a piston freely sliding therebetween, and a first three-way poppet valve according to claim 10, said poppet valve being connected by its working port to said first end, by its second port to a source of high-pressure working fluid and by its first port to a non-pressurized discharge outlet.

16. A work exchanger module adapted to utilize the energy of high-pressure working fluid for Pumping feed fluid to a feed fluid consumer, comprising an exchanger cylinder with a first working fluid end and a second feed fluid end, a piston freely sliding therebetween, and a first three-way poppet valve comprising a housing with a first port, a second port, a third working port and a generally cylindrical valve chamber with an axis, said valve chamber being defined between a first coaxial annular valve seat associated with said first port, and a second coaxial annular valve seat associated with said second port, said working port being connected laterally to said valve chamber, said poppet valve further comprising a poppet body disposed in said valve chamber and adapted for reciprocation between two positions so that in a first position the poppet body seals said first valve seat and fluid communication is provided between said second port and said working port, and in a second position the poppet body seals said second valve seat and fluid communication is provided between said first port and said working port; wherein said housing has a first coaxial cylindrical passage adjacent said first valve seat and a second coaxial cylindrical passage adjacent said second valve seat, said poppet body has a first coaxial cylinder part slidingly and sealingly fitting said first passage, and a second coaxial cylinder part slidingly and sealingly fitting said second passage, so that said poppet body is always supported in at least one of the cylindrical passages and fluid communication between said first and said second ports is always prevented, said poppet valve being connected by its working port to said first end, by its second port to a source of high-pressure working fluid and by its first port to a non-pressurized discharge outlet, further comprising a second three-way poppet valve according to claim 10, said second poppet valve being connected by its working port to said second end, by its first port to a source of low-pressure feed fluid and by its second port to a high-pressure feed fluid consumer.

17. The work exchanger module of claim 16, wherein the axial rods of the two poppet valves are extending outside the housings, the module further comprising a first hydraulic cylinder connected to the rod of the first poppet valve for driving thereof and a second hydraulic cylinder connected to the rod of the second poppet valve for driving thereof.

18. The work exchanger module of claim 17, where said hydraulic cylinders have each a "push" and a "pull" port, such that connecting the "push" port to a pressure source would drive the associated poppet valve to the first position thereof and connecting the "pull" port to a pressure source would drive the associated poppet valve to the second position thereof, wherein the "push" port of the first hydraulic cylinder is connected directly to the "pull" port of the second hydraulic cylinder.

19. The work exchanger module of claim 18, wherein the flaring part of the first cylindrical passage in said first three-way poppet valve is axially longer than the corresponding flaring part in said second three-way poppet valve, so that during synchronized motion of the two poppet bodies towards opening the first port in both three-way valves, the first port in the first valve is connected to the exchanger cylinder before the first port of the second valve.

20. A three-way two-position poppet valve comprising a housing with a first port, a second port, a third working port and a generally cylindrical valve chamber with an axis, said valve chamber being defined between a first coaxial annular valve seat associated with said first port, and a second coaxial annular valve seat associated with said second port, said working port being connected laterally to said valve chamber, said valve housing having a first coaxial cylindrical passage adjacent said first valve seat and being of smaller radial dimension therefrom, and a second coaxial cylindrical passage adjacent said second valve seat and being of a smaller radial dimension therefrom; said poppet valve further comprising a poppet body disposed in said valve chamber and adapted for reciprocation between two positions so that in a first position the poppet body seals said first valve seat by axial pressure thereagainst and fluid communication is provided between said second port and said working port, and in a second position the poppet body seals said second valve seat by axial pressure thereagainst and fluid communication is provided between said first port and said working port; wherein
    said poppet body has a first coaxial cylinder part slidingly and sealingly fitting said first passage, and a second coaxial cylinder part slidingly and sealingly fitting said second passage, so that said poppet body is always supported in at least one of the cylindrical passages and fluid communication between said first and said second ports is always prevented.

21. A three-way poppet valve according to claim 20, said first valve seat is at a distal end of said first cylindrical passage, adjacent said first port, and a distal end of said first cylinder part of the poppet is equipped with a first sealing rim matching said first valve seat so as to provide said axial pressure, and said second valve seat is at a proximal end of said second cylindrical passage, adjacent said valve chamber, and a proximal end of said second cylinder part of the poppet is equipped with a second sealing rim matching said second valve seat so as to provide said axial pressure.

* * * * *

UNITED STATES PATENT AND TRADEMARK OFFICE
CERTIFICATE OF CORRECTION

| | |
|---|---|
| PATENT NO. | : 7,540,230 B2 |
| APPLICATION NO. | : 10/559732 |
| DATED | : June 2, 2009 |
| INVENTOR(S) | : Henrikh Rojanskiy et al. |

It is certified that error appears in the above-identified patent and that said Letters Patent is hereby corrected as shown below:

Title page item (60) insert the following:

--(60) Provisional application No. 60/477,751, filed on Jun. 12, 2003--

Signed and Sealed this

Fifteenth Day of September, 2009

David J. Kappos
*Director of the United States Patent and Trademark Office*